(12) United States Patent
Srinivasan et al.

(10) Patent No.: US 10,826,838 B2
(45) Date of Patent: Nov. 3, 2020

(54) SYNCHRONIZED JITTER BUFFERS TO HANDLE CODEC SWITCHES

(71) Applicant: Microsoft Technology Licensing, LLC, Redmond, WA (US)

(72) Inventors: Sriram Srinivasan, Sammamish, WA (US); Vinod Prakash, Redmond, WA (US); Soren Skak Jensen, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 16/260,771

(22) Filed: Jan. 29, 2019

(65) Prior Publication Data

US 2020/0244584 A1   Jul. 30, 2020

(51) Int. Cl.
    *H04L 12/841*   (2013.01)
    *H04N 21/44*    (2011.01)
    *H04N 21/43*    (2011.01)
    *H04L 12/26*    (2006.01)
    *H04L 29/06*    (2006.01)

(52) U.S. Cl.
    CPC .......... *H04L 47/283* (2013.01); *H04L 43/087* (2013.01); *H04L 65/80* (2013.01); *H04N 21/4302* (2013.01); *H04N 21/44004* (2013.01)

(58) Field of Classification Search
    CPC ..... H04L 47/283; H04L 65/80; H04L 43/087; H04N 21/4302; H04N 21/44004
    See application file for complete search history.

(56) References Cited

U.S. PATENT DOCUMENTS

| 7,307,980 | B1 | 12/2007 | Shah |
| 2004/0022262 | A1* | 2/2004 | Vinnakota ............... H04L 49/90 370/429 |
| 2004/0062260 | A1 | 4/2004 | Raetz et al. |

(Continued)

FOREIGN PATENT DOCUMENTS

| EP | 1827030 A2 | 8/2007 |
| EP | 2120416 A1 | 11/2009 |
| WO | WO 2001/045374 A1 | 6/2001 |

OTHER PUBLICATIONS

Assem et al., "A Generic Algorithm for Mid-Call Audio Codec Switching," *In Proceedings of IFIP/IEEE International Symposium on Integrated Network Management*, 6 pages, May 27, 2013.

(Continued)

*Primary Examiner* — Mohammad S Anwar
(74) *Attorney, Agent, or Firm* — Klarquist Sparkman, LLP (57) ABSTRACT

Techniques are described for managing synchronized jitter buffers for streaming data (e.g., for real-time audio and/or video communications). A separate jitter buffer can be maintained for each codec. For example, as data is received in network packets, the data is added to the jitter buffer corresponding to the codec that is associated with the received data. When data needs to be read, the same amount of data is read from each of the jitter buffers. In other words, at each instance where data needs to be obtained (e.g., for decoding and playback), the same amount of data is obtained from each of the jitter buffers. In addition, the multiple jitter buffers use the same playout timestamp that is synchronized across the multiple of jitter buffers.

20 Claims, 8 Drawing Sheets

(56) References Cited

U.S. PATENT DOCUMENTS

| | | | | |
|---|---|---|---|---|
| 2004/0076191 | A1* | 4/2004 | Sundqvist | H04L 47/10 |
| | | | | 370/516 |
| 2009/0003369 | A1* | 1/2009 | Lundin | H04J 3/0632 |
| | | | | 370/412 |
| 2013/0343381 | A1* | 12/2013 | Klimker | H04L 65/605 |
| | | | | 370/389 |
| 2014/0334311 | A1* | 11/2014 | Wong | H04L 47/12 |
| | | | | 370/236 |
| 2015/0110134 | A1* | 4/2015 | Kozica | H04N 21/44004 |
| | | | | 370/516 |

OTHER PUBLICATIONS

Ast, "The Effect of Dynamic Voice Codec Selection for Active Calls on Voice Quality," *In Thesis of Wichita State University*, 83 pages, May 2007.

Waltermann et al., "A Technique for Seamless VoIP-Codec Switching in Next Generation Networks," *In Proceedings of IEEE International Conference on Communications*, pp. 1772-1776, May 19, 2008.

"International Search Report and Written Opinion Issued in PCT Application No. PCT/US20/014301", dated Mar. 25, 2020, 12 Pages.

* cited by examiner

First example – no time-scale modifications 210

Second example – reduce delay in jitter buffers 220

Third example – increase delay in jitter buffers 230

SYNCHRONIZED JITTER BUFFERS TO HANDLE CODEC SWITCHES

BACKGROUND

Real-time communication services are used to communicate audio, video, and other types of streaming data via a computer network, such as the internet. In order to provide a good user experience, real-time communication services need to communicate streaming data with low latency while being able to handle changing network conditions (e.g., changes in bandwidth and reliability).

In some solutions, a single codec is used for a real-time communication session (e.g., for an audio call). The single codec can be associated with a single jitter buffer that manages latency for the session. However, a single codec and associated jitter buffer is limited in its ability to adapt to varying network conditions.

In some solutions, multiple codecs and associated jitter buffers are used for a real-time communication session. While such solutions can allow for switching codecs during the communication session, they have a number of issues. For example, such solutions may lose data during a codec switch and/or may not be able to handle frequent codec switches.

Therefore, there exists ample opportunity for improvement in technologies related to managing synchronized jitter buffers for codec switches.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for managing synchronized jitter buffers for streaming data (e.g., for real-time audio and/or video communications). A separate jitter buffer can be maintained for each codec that handles a given type of data (e.g., audio or video data). For example, as data is received in network packets, the data is added to the jitter buffer corresponding to the codec that is associated with the received data. When data needs to be read, the same amount of data is read from each of the jitter buffers. In other words, at each instance where data needs to be obtained (e.g., for decoding and playback), the same amount of data is obtained from each of the jitter buffers. In addition, the multiple jitter buffers use the same playout timestamp that is synchronized across the multiple jitter buffers.

For example, a computing device can perform operations for managing synchronized jitter buffers for streaming data. The operations comprise, upon receiving a network packet comprising streaming data, placing the received streaming data in a first jitter buffer when the received streaming data is associated with a first codec, and placing the received streaming data in a second jitter buffer when the received streaming data is associated with a second codec. The operations further comprise, at each instance where data is read, obtaining an amount of data from the first jitter buffer, and obtaining the amount of data from the second jitter buffer. The first jitter buffer and the second jitter buffer both use a playout timestamp that is synchronized across the first jitter buffer and the second jitter buffer.

As described herein, a variety of other features and advantages can be incorporated into the technologies as desired.

DETAILED DESCRIPTION

Overview

As described herein, various techniques and solutions can be applied to manage synchronized jitter buffers for streaming data (e.g., for real-time audio and/or video communications) to support codec switching. A separate jitter buffer can be maintained for each codec (e.g., for each independent codec and/or for each codec mode of a given codec) that handles a given type of data (e.g., audio or video data). For example, as data is received in network packets, the data is added to the jitter buffer corresponding to the codec (individual codec or codec mode) that is associated with the received data. When data needs to be read, the same amount of data is read from each of the jitter buffers. In other words, at each instance where data needs to be obtained (e.g., for decoding and playback), the same amount of data is obtained (e.g., read) from each of the jitter buffers. In addition, the multiple jitter buffers use the same playout timestamp that is synchronized across the multiple of jitter buffers.

Jitter buffers are used to compensate for jitter in a computer network. Jitter happens when network packets arrive with variable delay (e.g., due to delay from intermediary devices such as routers or switches, due to different paths through the network, etc.). Jitter buffers are often used with streaming audio and/or video services (e.g., real-time communication services, such as VoIP). Playback disruptions (e.g., playback gaps or drop-outs) can occur if a jitter buffer is not used. For example, consider real-time audio that is being streaming over the Internet using network packets sent 20 ms apart and with 20 ms of audio data per network packet. If the network packets are received exactly every 20 ms, then playback is smooth and no jitter buffer is needed. However, if the network packets are not received exactly every 20 ms (e.g., one packet received 25 ms after the other, or the packets are received out-of-order), then there will be periods where no data is available for playback causing playback disruptions. Jitter buffers can be used to compensate for this issue. For example, a jitter buffer can be used that stores 500 ms of streaming data that compensates for varying delay between network packets and/or out-of-order network packets.

Various solutions have been provided to handle codec switches (e.g., switching between different codecs and/or switching between different modes or bitrates within a given codec). In some solutions, a single jitter buffer is used. Upon a codec switch, the single jitter buffer is flushed when new data is received for the new codec or mode. Any data remaining in the jitter buffer when it is flushed is lost. For example, if the jitter buffer contains 500 ms of audio data when it is flushed, the 500 ms of audio data is lost and not available for playback. This lost data can result in disruptions. For example, audio and/or video disruptions can be caused by the lost data.

In other solutions, two jitter buffers are used but data is read from only one jitter buffer at a time. To illustrate this solution, consider jitter buffer A that stores data for codec A and jitter buffer B that stores data for codec B. During a first time period, data is received for codec A and placed into jitter buffer A. Subsequently, there is a switch to codec B and data received for codec B is placed into jitter buffer B. In this solution, the data in jitter buffer A is not flushed when the switch is made, and instead it is read out until it is empty, at which time data is read from jitter buffer B. This type of two jitter buffer solution can work in some situations, but it has a number of drawbacks. First, if there is another codec switch back to codec A before the data in jitter buffer A has been drained, then the switch to codec B will not happen even though data has been received for codec B and is waiting in jitter buffer B. This issue can result in playback disruptions (e.g., the data in jitter buffer B can be essentially lost). Second, a problem can occur with out-of-order packets that results in the two jitter buffers going out of sync. To illustrate this problem, consider network packets 1-100 that are encoded using codec A and network packets 101-200 that are encoded using codec B. At the receiving device, the network packets arrive in the following sequence: network packets 1-50 arrive first and are placed in jitter buffer A, and network packets 101-200 arrive next and are placed in jitter buffer B. Once the data in jitter buffer A is read out (also referred to as drained), the data in jitter buffer B will begin to be read out. Next (while the data in jitter buffer B is being drained), network packets 51-100 arrive and are placed into jitter buffer A. The data from network packets 51-100 will be read out after jitter buffer B is empty. This results in a problem because later packets have already been played back (e.g., resulting in playback disruption).

In the technologies described herein, multiple jitter buffers are maintained, each jitter buffer corresponding to a different codec (e.g., a different audio codec or a different codec mode within a single codec). For example, the different codecs could support different bitrates or complexities (e.g., a first codec that uses fewer computing resources over a high bandwidth connection and a second codec that uses more computing resources over a lower bandwidth connection). As data is received in network packets, the data is added to the jitter buffer corresponding to the codec that is associated with the received data. For example, the data is added to the jitter buffer in its playout position according to the timestamp of the data. When data needs to be read (e.g., when data is obtained from the jitter buffer for playout, which can comprise audio and/or video output), the same amount of data is read from each of the jitter buffers. In other words, at each instance where data needs to be obtained (e.g., for decoding and playback), the same amount if data is obtained (e.g., read) from each of the jitter buffers. In addition, the multiple jitter buffers use the same playout timestamp that is synchronized across the multiple of jitter buffers.

Using the technologies described herein provides advantages over previous solutions. For example, the technologies described herein support switching between codecs at any time. Because data is obtained from each jitter buffer at each instance, the buffer that produces valid data (e.g., with the highest amount of valid versus synthetic data) can be used (e.g., decoded and output). This allows codec switches anytime without the issue discussed above with previous solutions that read from only the current jitter buffer. As another example, the technologies described herein maintain synchronized playout timestamps between the jitter buffers which solves problems with out-of-order packets. As another example, the technologies described herein can apply the same time-scale modifications to each jitter buffer, which can ensure that the playout timestamps are maintained in sync.

The technologies described herein also provide benefits in terms of reliability and efficiency (e.g., of real-time network communications services). For example, the technologies described herein can support codec switching on an arbitrary basis between any number of codecs and associated jitter buffers. In addition, the switching can be performed without any loss in data (e.g., without flushing buffers).

In some implementations, the streaming data is encoded and transmitted from a transmitting device to a receiving device according to the real-time transport protocol (RTP). RTP is a network protocol for streaming audio and/or video data using internet protocol (IP) networks. For example, an RTP packet can contain a frame of audio data containing 20 ms of audio samples.

Multiple Jitter Buffers

In the technologies described herein, multiple jitter buffers are maintained. Each jitter buffer is associated with a codec (e.g., a specific independent codec or a specific codec mode of a given codec) that handles a given type of data (e.g., audio or video data). For example, all of the jitter buffers could store audio data, all of the jitter buffers could store video data, or all of the jitter buffers could store another type of data.

For example, a streaming media system could support two (or more) operating modes. A first operating mode could be a low bitrate mode that operates over network connections with limited bandwidth. A second operating mode could be a high bitrate mode that operates over network connections with high bandwidth. The first operating mode could communicate streaming data (e.g., audio or video data) according to a first codec (e.g., a high-complexity codec or codec mode that supports a relatively low bitrate). The second operating mode could communicate streaming data (e.g., audio or video data) according to a second codec (e.g., a low-complexity codec or codec mode that supports a relatively high bitrate).

Each of the codecs is associated with its own jitter buffer at the computing device that is receiving and/or decoding the streaming media. For example, the computing device could be one device participating in a real-time communication session that is receiving and decoding audio and/or video data for playback to a user of the computing device. The real-time communication session can support switching between codecs during the session in response to changes in network conditions or based on other criteria.

Time-Scale Modifications

In some implementations, maintaining multiple jitter buffers in sync includes performing the same time-scale modifications to each of the multiple jitter buffers. Time-scale modifications can include stretch operations (which increase the delay in the jitter buffers) and compress operations (which decrease the delay in the jitter buffers).

With a stretch operation (also referred to as a time-scale stretch operation) the data that is obtained from the jitter buffer is expanded. For example, if 20 ms of audio data is being read form a jitter buffer, then the 20 ms of audio data can be stretched to result in an increased amount of audio data (e.g., 25 ms of audio data).

In order to maintain synchronization between multiple jitter buffers, when a stretch operation is performed to one jitter buffer, the same stretch operation can be performed to all of the other jitter buffers.

With a compress operation (also referred to as a time-scale compress operation) the data that is obtained from the jitter buffer is compressed. For example, if 40 ms of audio data is being read from a jitter buffer, then the 40 ms of audio data can be compressed to produce 20 ms of audio data. The result would be a reduction of 20 ms of delay in the jitter buffer.

In order to maintain synchronization between multiple jitter buffers, when a compress operation is performed to one jitter buffer, the same compress operation can be performed to all of the other jitter buffers.

If delay does not need to be increased or decreased, then the jitter buffer delay can be maintained at its current level. Maintaining the jitter buffer with its current delay is also referred to as a maintain operation (e.g., which is also referred to as a no op).

Reading Data at Each Instance

In the technologies described herein, one way that multiple jitter buffers are maintained in sync is by reading from each of the multiple jitter buffers at every instance that data needs to be obtained for a given type of data (e.g., for audio data or for video data). For example, when data needs to be obtained for playout (e.g., for decoding and output), the same amount of data is obtained from each of the multiple jitter buffers. For example, a real-time audio communication service could read audio data from the jitter buffers for playout every 20 ms. Other systems could read data on another periodic basis.

Because data is typically only received for one codec at a given time and because the playout timestamps are maintained in sync, only one of the jitter buffers will typically provide valid data. Valid data refers to real data (e.g., streaming audio or video data that is received from a transmitting computing device). The other jitter buffer(s) will typically provide synthetic data. Synthetic data refers to data that has been generated (e.g., by the jitter buffer and/or by another component). Synthetic data could be audio noise data, concealment data (e.g., data typically used for data loss concealment), or another type of synthetic data.

Depending on the implementation and/or the amount of data being read from the jitter buffers, a given amount of data may contain both valid data and synthetic data. For example, data obtained from a first jitter buffer could contain 18 ms of valid audio data and 2 ms of synthetic audio data, while data obtained from a second jitter buffer could contain 16 ms of valid audio data and 2 ms of synthetic audio data.

Even though the same amount of data is obtained from each of the jitter buffers, only one of the jitter buffer's data will be used. The data that is not used can be discarded. In some implementations, the decision of which jitter buffer's data to use is based at least in part on how much synthetic data is present in the data obtained from each jitter buffer. In some implementations, the jitter buffer's data with the least amount of synthetic data is selected and used (e.g., for decoding and playback). For example, if a first jitter buffer produces an amount of data containing 18 ms of valid audio data and 2 ms of synthetic audio data and a second jitter buffer provides an amount of data containing 16 ms of valid audio data and 2 ms of synthetic audio data, then the amount of data provided by the first jitter buffer will be used because it only contains 2 ms of synthetic audio data which is less than the 4 ms of synthetic audio data provided by the second jitter buffer. In some implementations, a quality measure is used to select which jitter buffer's data to use (e.g., for decoding and playback). For example, the quality measure could be based on the combination of valid and synthetic data in the data obtained from each jitter buffer. The data from the jitter buffer with the highest quality score could be selected for use.

In some situations, there may be a tie between the amounts of data obtained from the jitter buffers. For example, each of the jitter buffers may return synthetic data. In such a situation, various tie breaking schemes can be applied to determine which jitter buffer's data to use. In some implementations, in the case of a tie, the jitter buffer whose data was used in the last instance will be selected.

Whenever there is a codec switch, an operation can be applied to smooth the transition. In some implementations, an overlap-add operation is applied to smooth the transition between the codecs.

In some implementations, indications are received that indicate how much synthetic data is contained within the amounts of data obtained from the jitter buffers. For example, the indications can indicate whether a given amount of data contains synthetic data and/or how much of a given amount of data is synthetic data (e.g., based on samples, time, percentage, or some other measure). Other types of indications can be received as well. For example, indications can be received indicating whether delay was increased or decreased in the jitter buffers. In some implementations, the indications are received as meta-data. For example, when jitter buffers are read, the data obtained can be associated with meta-data.

Environments for Managing Synchronized Jitter Buffers

Figure 1:
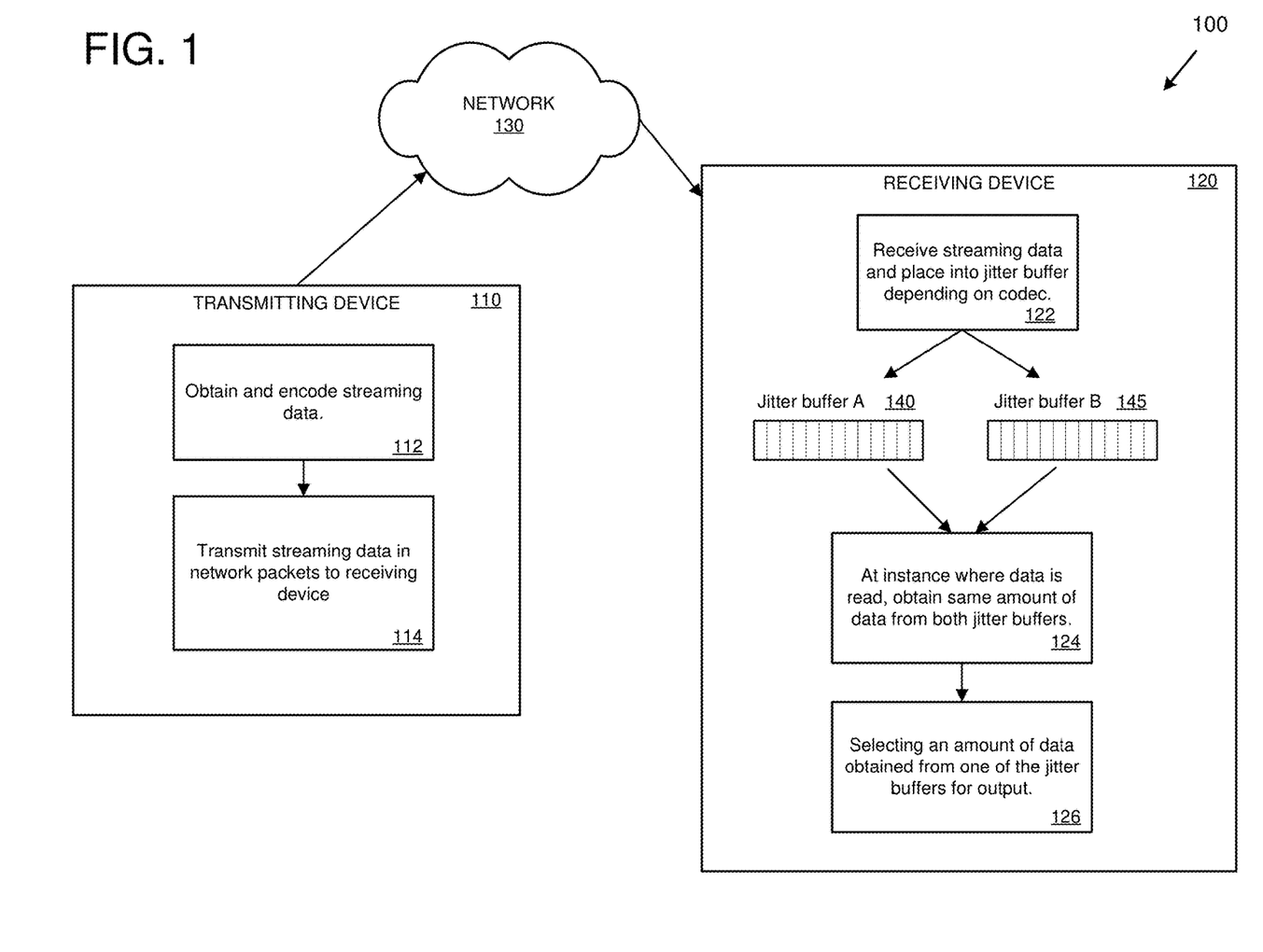
FIG. 1 is a diagram depicting an example environment for managing synchronized jitter buffers for streaming data.

FIG. 1 is a diagram depicting an example environment 100 for managing synchronized jitter buffers for streaming data. The synchronized jitter buffers are used to handle codec switches, where each jitter buffer is associated with a specific codec for a given type of data (e.g., audio data or video data). The example environment 100 depicts a transmitting device 110. The transmitting device 110 can be any type of computing device (e.g., server computer, virtual machine, desktop computer, laptop computer, tablet, phone, or another type of computing device) that encodes and transmits streaming data (e.g., streaming audio and/or video).

As depicted at 112, streaming data is obtained an encoded. For example, the streaming data can be audio and/or video data. For example, the data can be frames of audio data (e.g., frames containing 20 milliseconds (ms) of audio samples) and/or frames of video data. In some implementations, the streaming data is obtained by the transmitting device 110 (e.g., from a microphone and/or camera). For example, the streaming data can be obtained and encoded as part of a real-time communication session (e.g., a VoIP session) between the transmitting device 110 and the receiving device 120.

At 114, the streaming data is transmitted in network packets to the receiving device 120. The receiving device 120 can be any type of computing device (e.g., server computer, virtual machine, desktop computer, laptop computer, tablet, phone, or another type of computing device) that receives and decodes streaming data (e.g., streaming audio and/or video). For example, each network packet can contain one or more frames of streaming audio and/or video data. The network packets are sent to the receiving device 120 via the computer network 130 (e.g., the internet and/or other types of private or public computer networks). The network packet can be transmitted to the receiving device 120 via a streaming network protocol, such as RTP or another streaming protocol.

In some implementations, the operations depicted at 112-114 are performed by one or more software components (e.g., encoders, network components, etc.) running on the transmitting device 110. For example, the components can be part of a real-time communications application, such as a VoIP application, in which the transmitting device 110 receives frames of data (e.g., audio data) for real-time encoding and transmission to the receiving device 120, where the data is decoded and output.

As depicted at 122, the receiving device 120 receives the network packets transmitted by the transmitting device 110. For each network packet, the receiving device 120 places the streaming data contained within the network packet into one of the jitter buffers, either jitter buffer A 140 or jitter buffer B 145, depending on which codec the streaming data is associated with. Jitter buffer A 140 is associated with a first codec (e.g., a first audio codec) and jitter buffer B 145 is associated with a second codec (e.g., a second audio codec). When the receiving device 120 receives a network packet, the network packet and/or streaming data can be checked (e.g., by checking header information, meta-data, etc.) to determine which codec is associated with the streaming data payload of the network packet (e.g., which codec should be used to decode the streaming data). Based upon the determined codec, the streaming data is placed into the appropriate jitter buffer. The example receiving device 120 depicts two example jitter buffers that are associated with two different codecs. However, in general any number of jitter buffers can be used, each associated with its respective different codec.

As depicted at 124, at each instance where data is read, the same amount of data is obtained from both jitter buffer A 140 and jitter buffer B 145. For example, at each instance 20 ms of audio data can be obtained from jitter buffer A 140 and 20 ms of audio data can be obtained from jitter buffer B 145. Depending on the data contained in the jitter buffers, some or all of the obtained data could be synthetic data.

As depicted at 126, at each instance where data is read, an amount of data obtained from one of the jitter buffers is selected for output (e.g., for decoding and presentation to a user of the receiving device 120). The amount of data can be selected based on how much synthetic data is present in the amounts of data obtained from the jitter buffers. For example, if the amount of data obtained from jitter buffer A 140 has less synthetic data than the amount of data obtained from jitter buffer B 145, then the amount of data obtained from jitter buffer A 140 can be used for output. The amount of data obtained from the other (non-selected) jitter buffer can be discarded or otherwise not used for output.

In some implementations, the operations depicted at 122-126 are performed by one or more software components (e.g., decoders, network components, etc.) running on the receiving device 120. For example, the components can be part of a real-time communications application, such as a VoIP application, in which the receiving device 120 receives network packets containing streaming data (e.g., streaming audio and/or video data) for real-time processing at the receiving device 120, where the data is decoded and output (e.g., played back in audio and/or video format).

In some implementations, the example environment 100 is an online real-time communication environment in which audio and/or video information is captured at the transmitting device 110 and transmitted to the receiving device 120 for presentation (e.g., as part of a real-time audio and/or video call, conference, meeting, etc.). For example, the online communication environment can comprise a voice over internet protocol (VoIP) service. As part of the communication, the receiving device 120 could also transmit audio and/or video back to the transmitting device 110 for presentation (e.g., as part of a two-way audio and/or video call). In addition, a number of other computing device (e.g., servers) can participate in communication (e.g., in a conference environment).

Figure 2:
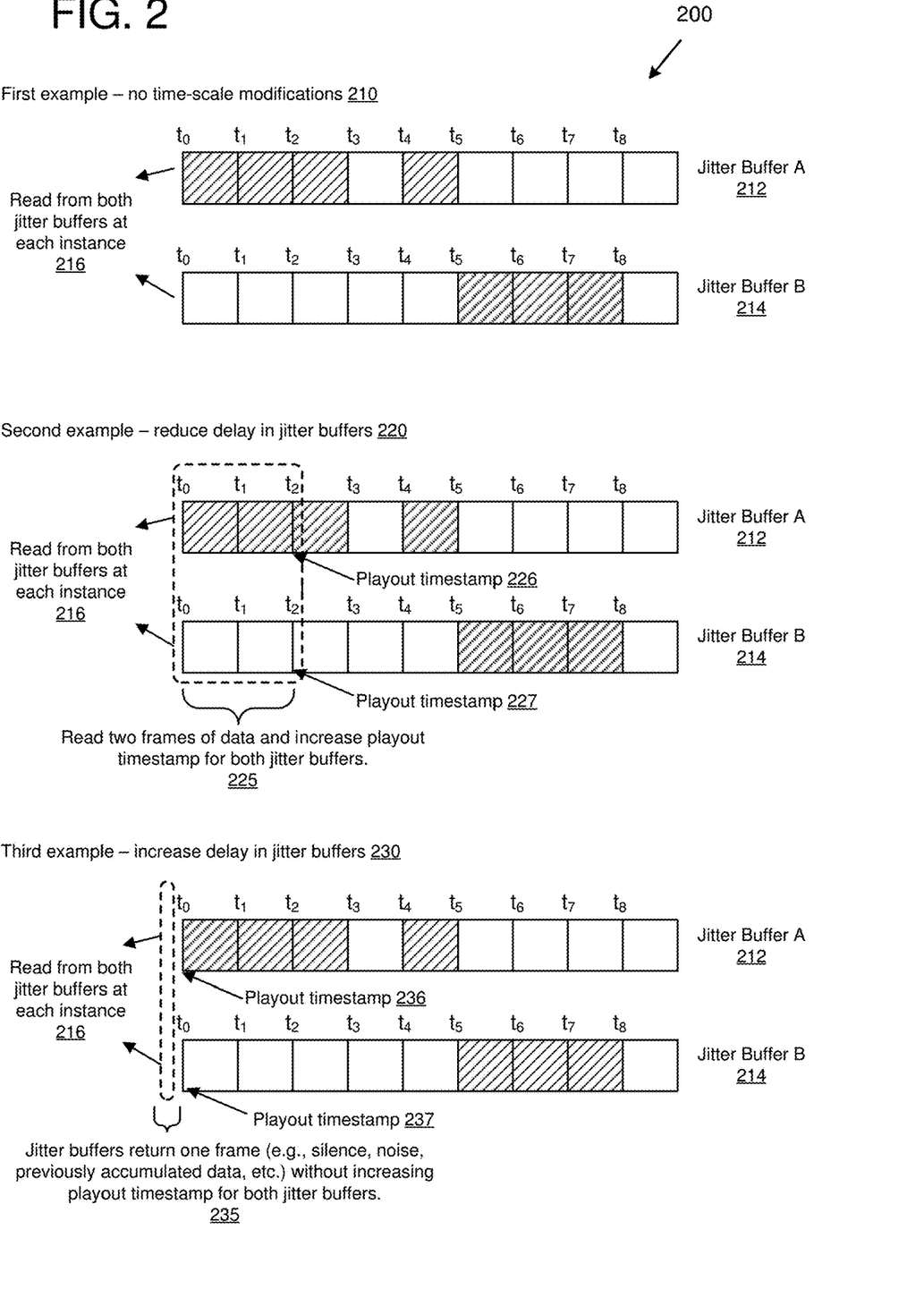
FIG. 2 is a diagram depicting examples of reading from multiple jitter buffers and applying time-scale modifications.

FIG. 2 is a diagram depicting examples 200 of reading from multiple jitter buffers and applying time-scale modifications. In the examples 200, two jitter buffers are depicted, jitter buffer A 221 (associated with a first audio codec) and jitter buffer B 214 (associated with a second audio codec). In the examples 200, each jitter buffer stores samples of audio data in 20 ms frames. Frames that are shaded contain real (valid) audio data while frames that are empty do not contain any real audio data. As depicted in the examples 200, jitter buffer A 212 contains four frames of real audio data (the frame at $t_3$ is missing, which could be due to a lost network packet or an out-of-order packet that has not yet been received), and jitter buffer B 214 contains three frames of real audio data. The frames of audio data are stored in the jitter buffers according to their playout positions. The switch to storing audio data in jitter buffer B 214 at $t_5$ is the result of a codec switch from the first codec to the second codec (e.g., during a real-time audio communication session, such as a VoIP session). In other implementations, the jitter buffers could contain video data or other types of data and could store the data in other units (e.g., in units of samples, pictures, seconds, bytes, etc.).

The jitter buffers, jitter buffer A 212 and jitter buffer B 214, have a playout timestamp that is synchronized across the jitter buffers (i.e., the playout timestamp is identical in both the first jitter buffer 212 and the second jitter buffer 214). The synchronized playout timestamp is illustrated in the examples 200 by the timestamp indicators $t_0$, $t_1$, $t_2$, and so on. For example, in the first example 210, the current playout timestamp is set at $t_0$, indicating that the next data that will be obtained from the jitter buffers is the data located at $t_0$ (e.g., the first 20 ms frame of audio data beginning at $t_0$).

As depicted at 216, data is read from both jitter buffer A 212 and jitter buffer B 214 at each instance. For example, during a real-time communication session, the same amount of audio data (e.g., 20 ms of audio data) is obtained from both jitter buffers every instance that data is read (e.g., every 20 ms).

In the first example 210, data is read from both jitter buffers with no time-scale modifications. For example, 20 ms of audio samples can be obtained from jitter buffer A 212 and 20 ms of audio samples can be obtained from jitter buffer B 214. After 20 ms of data is obtained from both jitter buffers, the playout timestamp is advanced so that it points to $t_1$ for both jitter buffer A 212 and jitter buffer B 214. The obtained data from jitter buffer A 212 would contain 20 ms of real data and the obtained data from jitter buffer B 214 would contain 20 ms of synthetic data. In some implementations, the amounts of data are examined to determine amounts of synthetic data contained in each. For example, meta-data could be received indicating that the 20 ms of data obtained from jitter buffer A 212 contains all real data and that the 20 ms of data obtained from jitter buffer B 214 contains all synthetic data. Based on these indications, one of the amounts of data can be selected for output. For example, because the 20 ms of data from jitter buffer A 212 contains real data, and the 20 ms of data from jitter buffer B 214 contains synthetic data, the data from jitter buffer A 212 can be selected for output (e.g., for decoding and playback).

In the second example 220, data is read from both jitter buffers while reducing delay in the jitter buffers (e.g., using a compress operation). In the second example, 220, two frames of data are read (40 ms total) and the playout timestamp is increased accordingly for both jitter buffers, as depicted at 225. Specifically, the playout timestamp is increased by 40 ms, to $t_2$, for both jitter buffers, as depicted at 226 and 227. While 40 ms of data is obtained from both jitter buffers, the 40 ms amounts are compressed to 20 ms. Only one of the amounts of data (either from jitter buffer A 212 or from jitter buffer B 214) is selected for output (e.g., the one with the least amount of synthetic data, which in this example would be from jitter buffer A 212).

In the third example 230, data is read from both jitter buffers while increasing delay in the jitter buffers (e.g., with a stretch operation). In the third example 230, increasing delay in the jitter buffers is performed by obtaining the same amount of data (e.g., 20 ms) from each jitter buffer without increasing the playout timestamp or draining the jitter buffers, as depicted at 235. In other words, actual data in the jitter buffers is not returned (e.g., the real data at to in jitter buffer A 212 is not drained in this implementation). This could be done by having the jitter buffers return 20 ms of silence or noise, or by returning an accumulated 20 ms of data from prior stretch operations. In this implementation, the playout timestamp remains the same for both jitter buffers, as depicted at 236 and 237.

In some implementations, increasing delay in the jitter buffers (e.g., with a stretch operation) is performed while increasing the playout timestamp. For example, using the third example 230, the playout timestamp is increased by 20 ms, to $t_1$, for both jitter buffers. While 20 ms of data is obtained from both jitter buffers, the 20 ms amounts are stretched by the same amount. For example, the 20 ms amounts of data could be stretched by 5 ms, 10 ms, or by some other amount. In some implementations, the amount of stretching depends on the type of data being obtained and/or the specific codec or codecs being used. For example, stretching of audio data can sound more natural if it is stretched based on certain audio parameters, such as pitch cycles. For example, if a pitch cycle of the audio data is 8 ms, then stretching can sound more natural if it is stretched by 8 ms. In such situations, the jitter buffers can report the amount of stretching that they are capable of. In some implementations, the additional amount of data obtained (e.g., the amount over 20 ms in this example) is stored in a working buffer (not depicted). The working buffer can store additional data (e.g., from multiple stretch operations) until a full frame of data is stored in the working buffer. When a full frame of data is stored in the working buffer (e.g., an amount sufficient to serve a full read request), then it can be returned without increasing the playout timestamp. In this way, the delay in the buffers is increased.

Methods for Managing Synchronized Jitter Buffers

In any of the examples herein, methods can be provided for managing synchronized jitter buffers for streaming data for a given type of data (e.g., audio data or video data). Managing synchronized jitter buffers includes switching between jitter buffers in response to codec switches.

Figure 3:
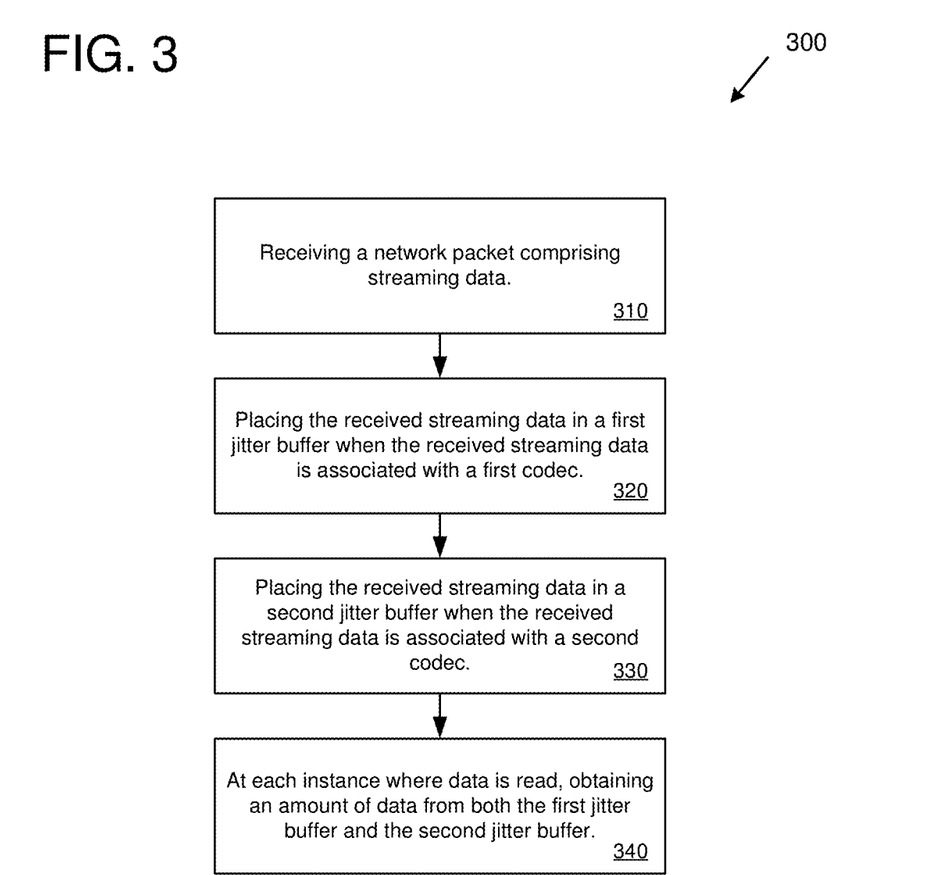
FIG. 3 is a flowchart of an example method for managing synchronized jitter buffers for streaming data during codec switches.

FIG. 3 is a flowchart of an example method 300 for managing synchronized jitter buffers for a given type of streaming data during codec switches. The streaming data can be transmitted, for example, by a streaming network protocol, such as RTP. For example, the example method 300 can be performed by a computing device, such as receiving device 120.

At 310, a network packet is received. The network packet comprises streaming data (e.g., streaming audio or video data). When the network packet is received, it is examined to determine which codec it is associated with (e.g., which codec was used to encode the streaming data contained within the network packet). For example, packet header information and/or streaming data information (e.g., meta-data) can indicate the associated codec.

At 320, the received streaming data is placed in a first jitter buffer when the received streaming data is associated with a first codec. At 330, the received streaming data is placed in a second jitter buffer when the received streaming data is associated with a second codec. For example, a number of network packets that contain streaming data associated with a first codec can be placed into the first jitter buffer. Upon a codec switch, a number of subsequent network packets that contain streaming data associated with a second codec can be placed into the second jitter buffer.

At 340, at each instance where data is read from the jitter buffers, an amount of data is obtained from both the first jitter buffer and the second jitter buffer. The amount of data that is obtained is the same amount (the same quantity) from both the first and second jitter buffers.

In the example method 300, both the first jitter buffer and the second jitter buffer use a playout timestamp that is synchronized across the first jitter buffer and the second jitter buffer. In some implementations, the playout timestamp for the first and second jitter buffers is adjusted by the same value corresponding to the amount of data that was obtained. For example, if 20 ms of audio data was obtained from the first and second jitter buffers, then the playout timestamp for the first and second jitter buffers can be increased by 20 ms (e.g., by a number of audio samples corresponding to 20 ms).

In some implementations, at each instance where data is read from the jitter buffers, a determination is made to select either the amount of data obtained from the first jitter buffer or the amount of data obtained from the second jitter buffer. The selected amount of data is used for playout. In some implementations, the determination is made based at least in part on the amount of synthetic data present in the obtained amount of data from each jitter buffer. For example, the amount of data that has less synthetic data can be used for playout (e.g., for decoding and playback to the user).

The example method 300 manage two jitter buffers corresponding to two codecs. However, the same operations can be used to manage one or more additional jitter buffers that store streaming data for one or more additional associated codecs, where the amount of data is obtained from the one or more additional jitter buffers at each instance where data is read, and where the playout timestamp is also synchronized across the one or more additional jitter buffers.

Figure 4:
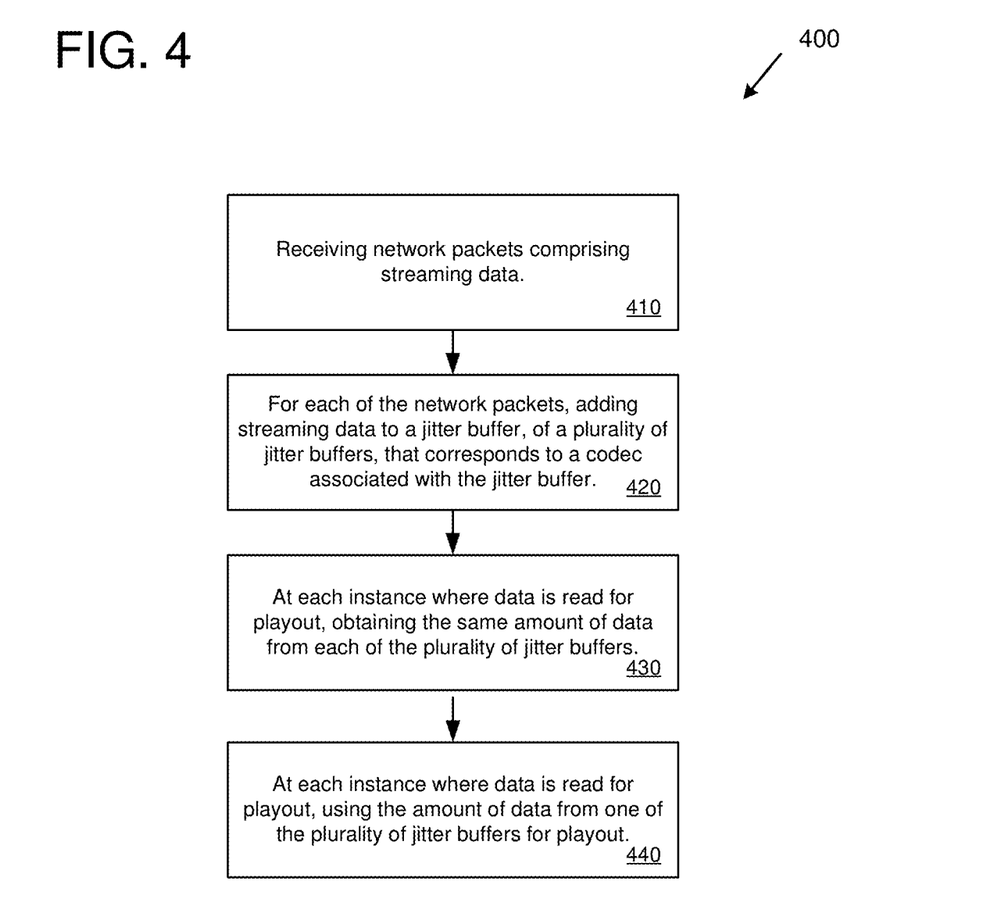
FIG. 4 is a flowchart of an example method for managing synchronized jitter buffers for streaming data during codec switches.

FIG. 4 is a flowchart of an example method 400 for managing synchronized jitter buffers for a given type of streaming data during codec switches. The streaming data can be transmitted, for example, by a streaming network protocol, such as RTP. For example, the example method 400 can be performed by a computing device, such as receiving device 120.

At 410, network packets comprising streaming data are received. The streaming data can be streaming audio data, streaming video data, or other types of streaming data.

At 420, for each of the received network packets, streaming data from the network packet is added to a jitter buffer, of a plurality of jitter buffers, that corresponds to a codec associated with the jitter buffers. Each of the plurality of jitter buffers is associated with a respective different codec.

At 430, at each instance where data is read for playout, the same amount of data is obtained from each of the plurality of jitter buffers. Some of the amounts of data may contain real data, some of the amounts of data may contain synthetic data, and some of the amounts may contain a mix of real and synthetic data.

At 440, at each instance where data is read for playout, the amount of data from one of the plurality of jitter buffers is used for playout. The amount of data can be selected based at least in part on amounts of synthetic data in the amounts of data. For example, the amount of data with the least amount of synthetic data can be selected.

In the example method 400, the plurality of jitter buffers use a playout timestamp that is synchronized across the plurality of jitter buffers. In some implementations, the playout timestamp for each of the plurality of jitter buffers is adjusted by the same value corresponding to the amount of data that was obtained. For example, if 20 ms of audio data was obtained from each of the jitter buffers, then the playout timestamp for each of the jitter buffers can be increased by 20 ms (e.g., by a number of audio samples corresponding to 20 ms).

Figure 5:
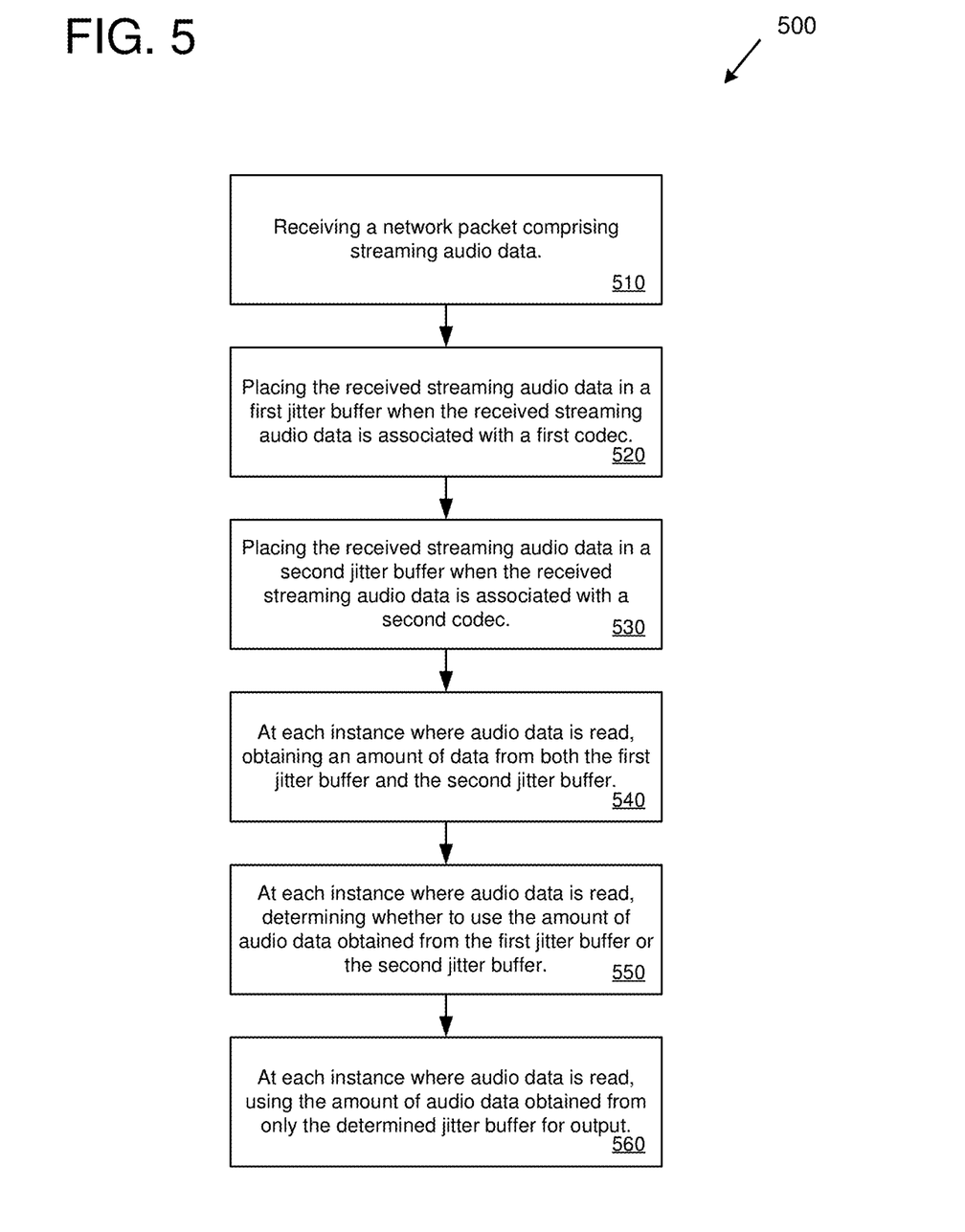
FIG. 5 is a flowchart of an example method for managing synchronized jitter buffers for streaming data during codec switches.

FIG. 5 is a flowchart of an example method 500 for managing synchronized jitter buffers for a given type of streaming data during codec switches. The streaming data can be transmitted, for example, by a streaming network protocol, such as RTP. For example, the example method 500 can be performed by a computing device, such as receiving device 120.

At 510, a network packet is received. The network packet comprises streaming audio data. When the network packet is received, it is examined to determine which codec it is associated with (e.g., which codec was used to encode the streaming audio data contained within the network packet). For example, packet header information and/or streaming data information (e.g., meta-data) can indicate the associated codec.

At 520, the received streaming audio data is placed in a first jitter buffer when the received streaming audio data is associated with a first audio codec. At 530, the received streaming audio data is placed in a second jitter buffer when the received streaming audio data is associated with a second audio codec. For example, a number of network packets that contain streaming audio data associated with a first audio codec can be placed into the first jitter buffer. Upon a codec switch, a number of subsequent network packets that contain streaming audio data associated with a second audio codec can be placed into the second jitter buffer.

At 540, at each instance where audio data is read from the jitter buffers, an amount of audio data is obtained from both the first jitter buffer and the second jitter buffer. The amount of audio data that is obtained is the same amount (the same quantity) from both the first and second jitter buffers.

At 550, at each instance where audio data is read from the jitter buffers, a determination is made to either use the amount of audio data obtained from the first jitter buffer or the amount of audio data obtained from the second jitter buffer for output (e.g., for decoding and playback). In some implementations, the determination is made based at least in part on the amount of synthetic audio data present in the obtained amount of audio data from each jitter buffer. For example, the amount of audio data that has less synthetic data can be used for playout (e.g., for decoding and playback to the user).

At 560, at each instance where audio data is read from the jitter buffers, the amount of audio data obtained from only the determined jitter buffer is used for output. For example, the amount of data can be decoded and played back to a user of the computing device.

In the example method 500, both the first jitter buffer and the second jitter buffer use a playout timestamp that is synchronized across the first jitter buffer and the second jitter buffer. In some implementations, the playout timestamp for the first and second jitter buffers is adjusted by the same value corresponding to the amount of audio data that was obtained. For example, if 20 ms of audio data was obtained from the first and second jitter buffers, then the playout timestamp for the first and second jitter buffers can be increased by 20 ms (e.g., by a number of audio samples corresponding to 20 ms).

The example method 500 manages two jitter buffers corresponding to two audio codecs. However, the same operations can be used to manage one or more additional jitter buffers that store streaming audio data for one or more additional associated audio codecs, where the amount of audio data is obtained from the one or more additional jitter buffers at each instance where data is read, and where the playout timestamp is also synchronized across the one or more additional jitter buffers.

Computing Systems

Figure 6:
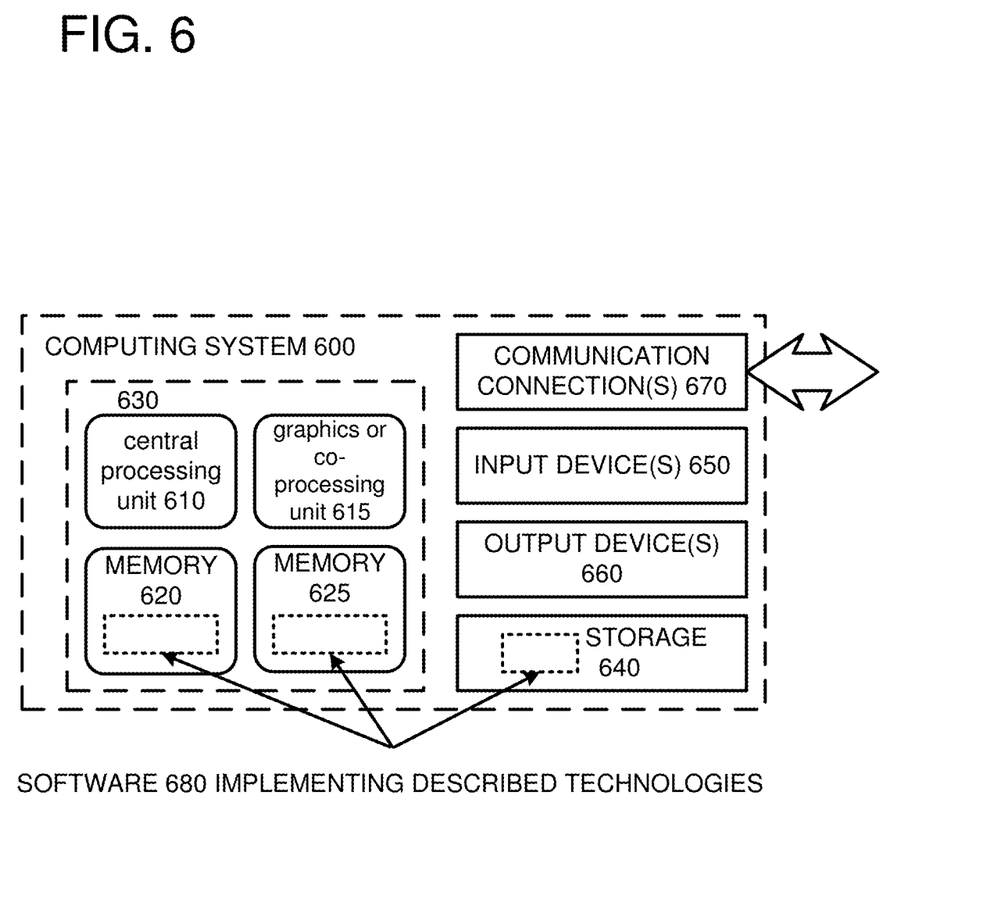
FIG. 6 is a diagram of an example computing system in which some described embodiments can be implemented.

FIG. 6 depicts a generalized example of a suitable computing system 600 in which the described technologies may be implemented. The computing system 600 is not intended to suggest any limitation as to scope of use or functionality, as the technologies may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more technologies described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more technologies described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 7:
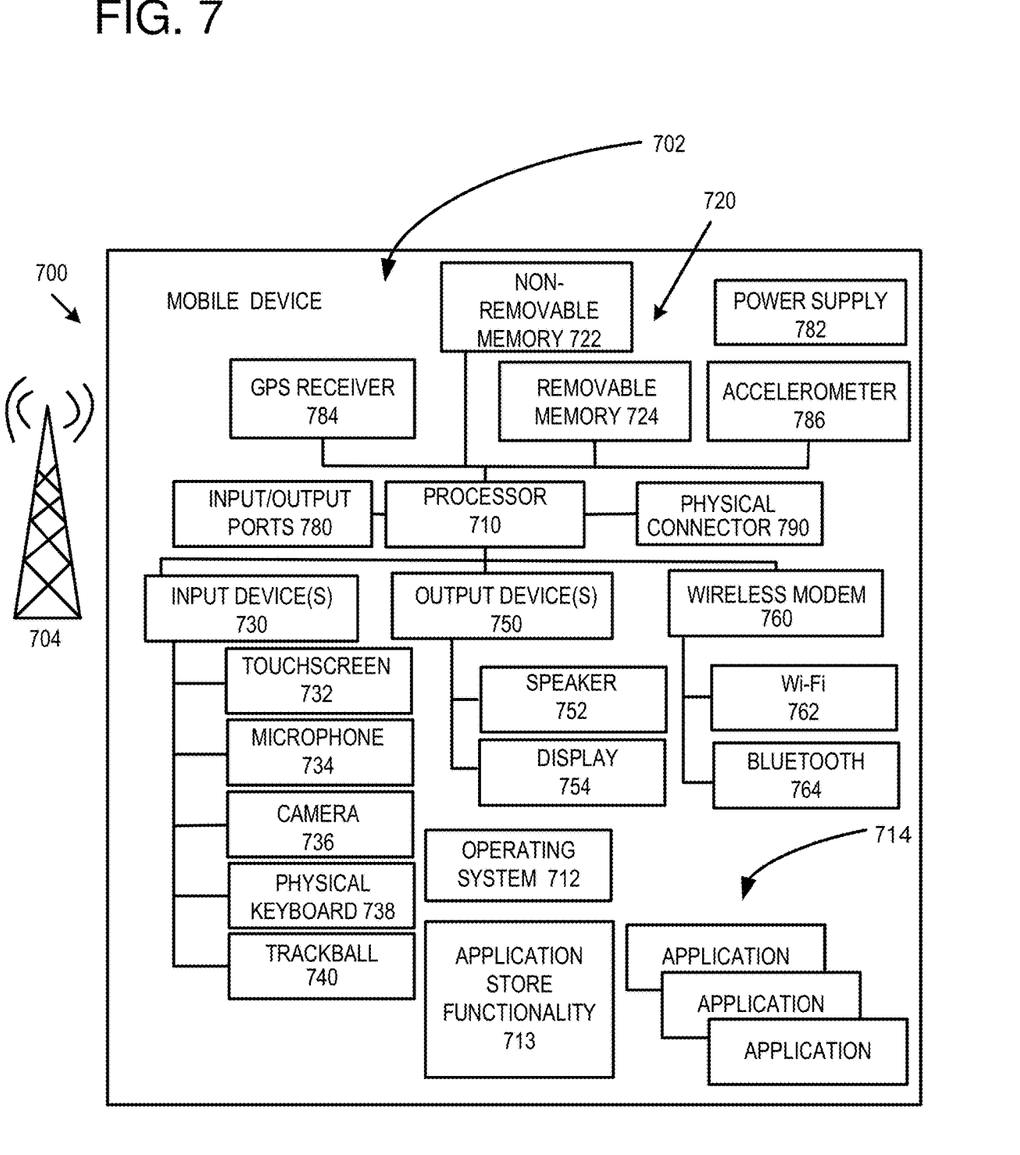
FIG. 7 is an example mobile device that can be used in conjunction with the technologies described herein.

FIG. 7 is a system diagram depicting an example mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Cloud-Supported Environment

Figure 8:
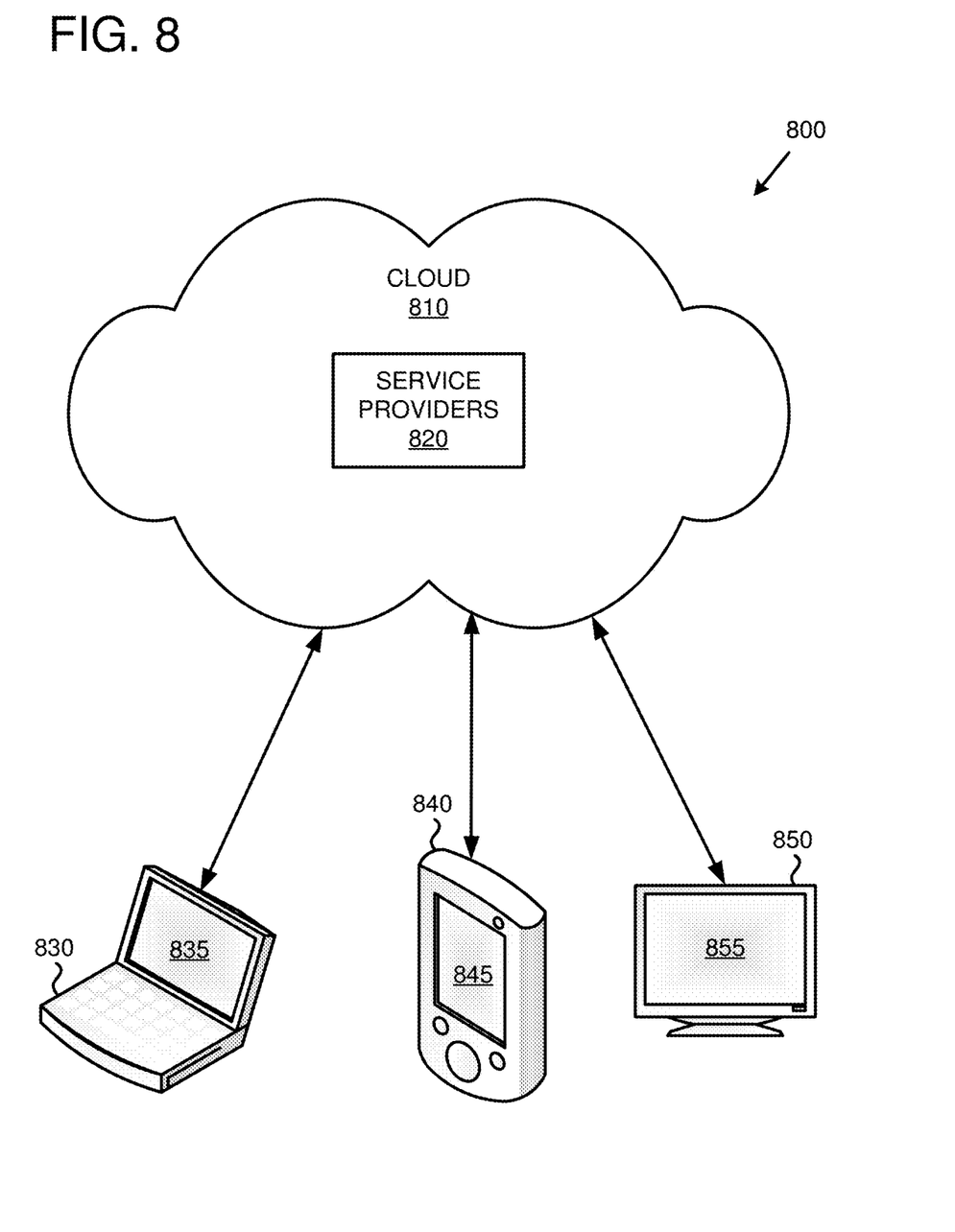
FIG. 8 is an example cloud-support environment that can be used in conjunction with the technologies described herein.

FIG. 8 illustrates a generalized example of a suitable cloud-supported environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections, such as 670, 760, 762, and 764.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processor;
   a network connection; and
   memory;
   the computing device configured, via computer-executable instructions, to perform operations for managing synchronized jitter buffers for a specific type of streaming data, the operations comprising:
   upon receiving, via the network connection, a network packet comprising streaming data:
   placing the received streaming data, of the specific type, in a first jitter buffer when the received streaming data is associated with a first codec; and
   placing the received streaming data, of the specific type, in a second jitter buffer when the received streaming data is associated with a second codec; and
   at each instance where data is read:
   obtaining an amount of data from the first jitter buffer; and
   obtaining the amount of data from the second jitter buffer;
   wherein the first jitter buffer and the second jitter buffer both use a playout timestamp that is synchronized across the first jitter buffer and the second jitter buffer.

2. The computing device of claim 1, the operations further comprising, at each instance where data is read:
   determining whether to use the amount of data obtained from the first jitter buffer or the amount of data obtained from the second jitter buffer; and
   using the amount of data from only the determined jitter buffer for playout.

3. The computing device of claim 2 wherein determining whether to use the amount of data obtained from the first jitter buffer or the amount of data obtained from the second jitter buffer is based at least in part on amounts of synthetic data present in the amount of data obtained from the first jitter buffer and the amount of data obtained from the second jitter buffer.

4. The computing device of claim 2 wherein determining whether to use the amount of data obtained from the first jitter buffer or the amount of data obtained from the second jitter buffer comprises:
   receiving one or more indications of how much synthetic data is contained within the amount of data obtained from the first jitter buffer and the amount of data obtained from the second jitter buffer; and
   based at least in part on the received indications, selecting the amount of data from the first jitter buffer when it has less synthetic data and selecting the amount of data from the second jitter buffer when it has less synthetic data.

5. The computing device of claim 1, the operations further comprising, at each instance where data is read:
   adjusting the playout timestamp for the first and second jitter buffers by a same value corresponding to the amount of data that was obtained, wherein the playout timestamp for the first and second jitter buffers is maintained in sync.

6. The computing device of claim 1, the operations further comprising:
   applying same time-scale modifications to the amount of data obtained from each of the first jitter buffer and the second jitter buffer.

7. The computing device of claim 1, the operations further comprising:
   applying a same time-scale operation to increase delay in both the first jitter buffer and the second jitter buffer.

8. The computing device of claim 1, the operations further comprising:
   applying a same time-scale compress operation to both the amount of data obtained from the first jitter buffer and the amount of data obtained from the second jitter buffer, wherein the same time-scale compress operation reduces delay in both the first jitter buffer and the second jitter buffer.

9. The computing device of claim 1 wherein the streaming data comprises streaming audio data that is received via real-time transport protocol (RTP).

10. The computing device of claim 1 wherein the operations manage one or more additional jitter buffers that store streaming data for one or more additional associated codecs, wherein the amount of data is obtained from the one or more additional jitter buffers at each instance where data is read, and wherein the playout timestamp is also synchronized across the one or more additional jitter buffers.

11. A method, implemented by a computing device, for managing a plurality of synchronized jitter buffers for a specific type of streaming data, the method comprising:
receiving network packets comprising streaming data;
for each of the received network packets, adding streaming data, of the specific type, from the network packet to a jitter buffer, of the plurality of jitter buffers, that corresponds to a codec associated with the jitter buffer, wherein each of the plurality of jitter buffers is associated with a respective different codec; and
at each instance where streaming data is read for playout:
reading a same amount of data from each of the plurality of jitter buffers; and
using the amount of data from one of the plurality of jitter buffers for playout;
wherein the plurality of jitter buffers use a same playout timestamp that is synchronized across the plurality of jitter buffers.

12. The method of claim 11, further comprising, at each instance where data is read:
determining which of the plurality of jitter buffer's amount of data to use based at least in part on amounts of synthetic data present in the amount of data obtained from each of the plurality of jitter buffers.

13. The method of claim 11 wherein determining which of the plurality of jitter buffer's amount of data to use comprises:
receiving one or more indications of how much synthetic data is contained within the amount of data obtained from each of the plurality of jitter buffers; and
based at least in part on the received indications, selecting the amount of data from the jitter buffer that has a least amount of synthetic data.

14. The method of claim 11, further comprising, at each instance where data is read:
adjusting the playout timestamp for each of the plurality of jitter buffers by a same value corresponding to the amount of data that was read, wherein the playout timestamp for the plurality of jitter buffers are maintained in sync.

15. The method of claim 11, further comprising, at each instance where data is read:
applying same time-scale modifications when reading from the plurality of jitter buffers, wherein the time-scale modifications comprise stretch operations and compress operations.

16. The method of claim 11 wherein the network packets are received as part of a real-time communication session comprising streaming audio and/or video data, and wherein the real-time communication session supports switching between each of the different codecs, and their associated jitter buffers, during the real-time communication session.

17. A computer-readable memory or storage device storing computer-executable instructions for execution on a computing device to perform operations for managing synchronized jitter buffers for streaming audio data, the operations comprising:
upon receiving a network packet comprising streaming audio data:
placing the received streaming audio data in a first jitter buffer when the received streaming audio data is associated with a first codec; and
placing the received streaming audio data in a second jitter buffer when the received streaming audio data is associated with a second codec; and
at each instance where audio data is read:
obtaining an amount of audio data from the first jitter buffer;
obtaining the amount of audio data from the second jitter buffer;
determining whether to use the amount of audio data obtained from the first jitter buffer or the amount of audio data obtained from the second jitter buffer; and
using the amount of audio data from only the determined jitter buffer for output;
wherein the first jitter buffer and the second jitter buffer both use a playout timestamp that is synchronized across the first jitter buffer and the second jitter buffer.

18. The computer-readable memory or storage device of claim 17 wherein determining whether to use the amount of audio data obtained from the first jitter buffer or the amount of audio data obtained from the second jitter buffer is based at least in part on amounts of synthetic audio data present in the amount of audio data obtained from the first jitter buffer and the amount of audio data obtained from the second jitter buffer.

19. The computer-readable memory or storage device of claim 17, further comprising:
applying same time-scale modifications to the amount of audio data obtained from each of the first jitter buffer and the second jitter buffer, wherein the time-scale modifications comprise stretch operations and compress operations.

20. The computer-readable memory or storage device of claim 17 wherein using the amount of audio data from only the determined jitter buffer for output comprises:
decoding the amount of audio data; and
providing the decoded amount of audio data for presentation to a user.

* * * * *